United States Patent
Krogh et al.

(10) Patent No.: US 11,799,357 B2
(45) Date of Patent: Oct. 24, 2023

(54) RELATING TO ELECTRICAL POWER GENERATORS FOR WIND TURBINES

(71) Applicant: Vestas Wind Systems A/S, Aarhus N. (DK)

(72) Inventors: Lars Langvardt Krogh, Egå (DK); Peter Mongeau, Center Conway, NH (US); Joris Kofman, Aalborg Øst (DK)

(*) Notice: Subject to any disclaimer, the term of this patent is extended or adjusted under 35 U.S.C. 154(b) by 249 days.

(21) Appl. No.: 17/606,473

(22) PCT Filed: Apr. 3, 2020

(86) PCT No.: PCT/DK2020/050088
§ 371 (c)(1),
(2) Date: Oct. 26, 2021

(87) PCT Pub. No.: WO2020/221402
PCT Pub. Date: Nov. 5, 2020

(65) Prior Publication Data
US 2022/0200402 A1    Jun. 23, 2022

Related U.S. Application Data

(60) Provisional application No. 62/841,279, filed on May 1, 2019.

(30) Foreign Application Priority Data

May 29, 2019 (DK) ............................ PA 2019 70352

(51) Int. Cl.
*H02K 7/18* (2006.01)
*H02K 15/00* (2006.01)
*H02K 15/14* (2006.01)

(52) U.S. Cl.
CPC ....... *H02K 7/1838* (2013.01); *H02K 15/0006* (2013.01); *H02K 15/14* (2013.01)

(58) Field of Classification Search
CPC ...... H02K 7/1838; H02K 15/14; Y02B 10/30; Y02E 10/72; F03D 80/82
See application file for complete search history.

(56) References Cited

U.S. PATENT DOCUMENTS

| | | | | |
|---|---|---|---|---|
| 3,243,617 | A | * | 3/1966 | Cunningham ........... H02K 9/06 310/68 R |
| 5,343,101 | A | * | 8/1994 | Matani ..................... H02K 9/06 310/58 |

(Continued)

FOREIGN PATENT DOCUMENTS

| CN | 201122882 Y | 9/2008 |
|---|---|---|
| EP | 1257037 A1 | 11/2002 |

(Continued)

OTHER PUBLICATIONS

Danish Patent and Trademark Office, Search and Examination Report in PA 2019 70352, dated Nov. 28, 2019.

(Continued)

*Primary Examiner* — Pedro J Cuevas
(74) *Attorney, Agent, or Firm* — Wood Herron & Evans LLP

(57) ABSTRACT

An electrical power generator for a wind turbine comprising: a generator housing, a stator at a radially outward position and a rotor in a radially inward position, wherein the rotor comprises a cylindrical ring structure arranged about a rotational axis, R, and defining a central hollow portion. The electrical power generator further comprises a rotor shroud attached to the generator housing and which extends about the rotational axis, R, wherein the rotor shroud includes a dome portion that extends into the central hollow portion of the rotor so as to protect the cylindrical ring structure of the rotor. Advantageously, the rotor shroud provides a tunnel-like surface that extends into the central hollow portion of the generator so as to prevent objects such as tools from (Continued)

contacting components of the rotor. The invention also relates to a method for 15 assembling such an electrical power generator with a rotor shroud.

22 Claims, 7 Drawing Sheets

(56) References Cited

U.S. PATENT DOCUMENTS

| | | |
|---|---|---|
| 9,627,949 B2 | 4/2017 | Booth et al. |
| 2011/0291415 A1 | 12/2011 | Damen et al. |
| 2011/0298330 A1 | 12/2011 | Joeckel |
| 2015/0061295 A1 | 3/2015 | Bjerg et al. |
| 2015/0102605 A1 | 4/2015 | Giengiel |
| 2015/0204314 A1 | 7/2015 | Anselmi |
| 2019/0323486 A1* | 10/2019 | Siegfriedsen ............ F03D 9/25 |

FOREIGN PATENT DOCUMENTS

| | | |
|---|---|---|
| EP | 2816224 A1 | 12/2014 |
| WO | 2019085439 A1 | 5/2019 |

OTHER PUBLICATIONS

European Patent Office, International Search Report and Written Opinion in PCT Application No. PCT/DK2020/050088, dated Jul. 23, 2020.

\* cited by examiner

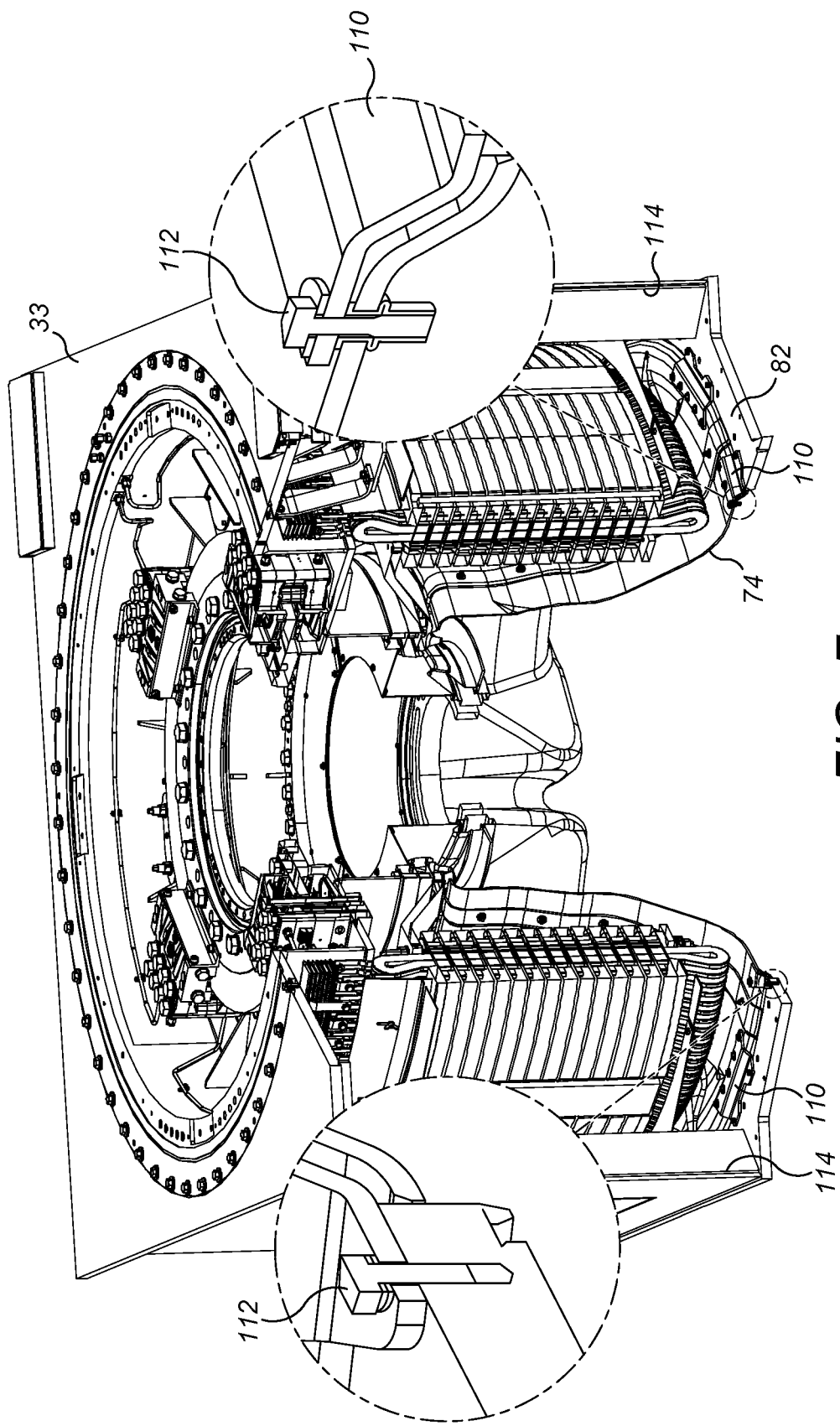

RELATING TO ELECTRICAL POWER GENERATORS FOR WIND TURBINES

TECHNICAL FIELD

The invention relates to a power generator for a wind turbine that is configured such that it is better able to be maintained by maintenance personnel.

BACKGROUND

As is well-known, wind turbines convert kinetic energy from the wind into electrical energy, using a rotor carrying a number of rotor blades. A typical Horizontal Axis Wind Turbine (HAWT) comprises a tower, a nacelle on top of the tower, a rotating hub or 'rotor' mounted to the nacelle and a plurality of rotor blades coupled to the hub. The nacelle houses many functional components of the wind turbine, including for example a generator, gearbox, drive train and rotor brake assembly, as well as convertor equipment for converting the mechanical energy at the rotor into electrical energy for provision to the grid. The gearbox steps up the rotational speed of the low speed main shaft and drives a gearbox output shaft. The gearbox output shaft in turn drives the generator, which converts the rotation of the gearbox output shaft into electricity. The electricity generated by the generator may then be converted as required before being supplied to an appropriate consumer, for example an electrical grid distribution system.

The generator is a critical component in the system and wind turbine manufacturers invest heavily in developing generator technology that is more efficient, more robust, and more readily maintained by suitably qualified technicians. Electrical generators used in utility-scale wind turbines are very large and heavy items that generate high voltages and strong magnetic fields. Therefore, they present challenging environments for technicians to carry out work and strict procedures must be established and followed to ensure the safety of those technicians. Particularly for permanent magnet generators, the strong magnetic fields that are present in a static generator can cause significant problems for maintenance technicians that are required to operate in that environment equipped with metal tools as those tools may be attracted strongly to magnetised regions of the generator.

It is against this background that the invention has been devised.

SUMMARY OF THE INVENTION

According to a first aspect of the invention, there is provided an electrical power generator for a wind turbine comprising: a generator housing, a stator at a radially outward position and a rotor in a radially inward position, wherein the rotor comprises a cylindrical ring structure arranged about a rotational axis, R, and defining a central hollow portion. The electrical power generator further comprises a rotor shroud attached to the generator housing and which extends about the rotational axis, R, wherein the rotor shroud includes a dome portion that extends into the central hollow portion of the rotor so as to protect the cylindrical ring structure of the rotor.

Advantageously, the rotor shroud provides a tunnel-like surface that extends into the central hollow portion of the generator so as to prevent objects such as tools from contacting components of the rotor.

Preferably, the rotor shroud may include a flange portion that flares radially outwards from the dome portion. The flange portion may therefore be used to connect the rotor shroud to a suitable point on the generator housing and thus support the dome portion in a cantilevered fashion.

Although the flange portion may simply abut the generator housing, preferably the flange portion is fixed to the housing to ensure a more robust and reliable connection. One option is for one or more fixing brackets to be provided that overlap the flange portion and respective regions of the housing so as to fix the flange portion to the housing.

Conveniently, therefore, the fixing brackets may be replaced if necessary due to wear or for other reasons. More specifically, in one embodiment, the flange portion is fixed to an annular flange of the housing that defines a central opening. Such a fixing arrangement may help ensure that the dome portion is located centrally within the central opening.

The rotor shroud may be manufactured as a single component. However, in a beneficial embodiment, the rotor shroud comprises a plurality of separable sections. Those separable sections may be identical. As such, the rotor shroud is easier to manufacture and transport.

Although the rotor shroud may define a smooth radially inward surface, in one embodiment the rotor shroud is shaped to define one or more channels in a radially inward facing surface thereof. Those channels may act to direct fluid such as leaked lubrication oil, to predetermined run-off points. In addition, or alternatively, drainage apertures may be provided to allow fluid to pass through the rotor shroud at predetermined points for collection into a suitable vessel the other side of the shroud.

In one embodiment, the dome portion defines an opening. The opening may provide access to maintenance personnel to areas beyond the surface of the rotor shroud. Also, the opening may serve as a channel through which other generator components may extend through the shroud. For example, a shaft, brake disc or other rotating components associated with the rotor may extend through the opening. In such a case, the opening may extend about the rotational axis of the rotor.

In one particular embodiment, the rotor shroud is configured such that the opening of the dome portion is positioned proximal to a drive component of the rotor. The positioning may be such that there is a predetermined close clearance, for example of between around 5 mm and 20 mm between the shroud and the drive component, which will tend to prevent airflow from passing through the centre of the generator, and instead cause cooling airflow to flow around the annular gap around the outside of the shroud which promote airflow cooling of the rotor.

In another aspect, the invention resides in a method of assembling an electrical power generator for a wind turbine, comprising:
- providing an electrical generator comprising a generator housing, a stator at an outward position and a rotor in an inward position, wherein the rotor comprises a cylindrical ring structure arranged about a rotational axis, R, so as to define a central hollow portion,
- providing a rotor shroud comprising a radially outer flange portion and a radially inner dome portion upstanding from the flange portion,
- orienting the electrical generator so that the rotational axis, R, is substantially vertical,
- aligning the rotor shroud with the electrical generator such that the dome portion of the rotor shroud is in line with the central hollow portion of the rotor;

moving the electrical generator and the rotor shroud relative to one another such that the dome portion of the rotor shroud is received into the central hollow portion of the rotor;

fixing the flange portion of the rotor shroud to the generator housing.

This method of assembly a rotor shroud into a generator is a convenient and effective approach to ensure alignment between the shroud and the internal volume of the generator, and to ensure that the shroud locates effectively into its final position before being secured to the generator housing. Orienting the electrical generator and the rotor in vertical alignment guards against the rotor shroud deforming under its own weight. This helps to ensure that the rotor shroud fits into the hollow portion accurately and is able readily to be fixed in position.

In one embodiment, the step of providing the rotor shroud includes placing the rotor shroud, and specifically the flange portion, on a base.

Here, the rotor shroud is supported on a base in a relatively lower position, wherein the electrical generator is supported above the rotor shroud prior to moving the electrical generator and the rotor shroud relative to one another. To bring the two components together, the electrical generator may be moved towards the rotor shroud.

In an alternative embodiment, the step of providing the electrical generator includes placing the electrical generator on a base. The base could be a transport pallet, for example, or an area of floor in an assembly hall. In this embodiment, the rotor shroud is supported above the electrical generator prior to moving the electrical generator and the rotor shroud relative to one another. To bring the two components together, the rotor shroud may be moved towards the electrical generator.

In either of these embodiments, the rotor shroud does not need to be moved into the electrical generator in one action. For example, the electrical generator could be moved down onto the rotor shroud part of the way, at which point the lowering is stopped. Control over the position of the electric generator and/or the rotor shroud may then be changed to a different mechanism. For example, the rotor shroud could then be lifted up by a hydraulic mechanism until it engages its final position within the electrical generator. Such an approach may provide assembly workers with more accurate control over the final positioning of the two components.

The base may include an alignment formation such that the shroud or the electrical generator, depending on the embodiment in question, is in alignment with its counterpart component when those components are moved towards each other. This guards against the rotor shroud or the electrical generator being knocked out of position during the assembly process.

In one embodiment, fixing the flange portion to the generator housing comprises positioning one or more brackets on the generator housing, said brackets overlaying a respective region of the generator housing and a neighbouring region of the flange portion of the rotor shroud; and fastening the brackets to the generator housing and the flange portion. Such an arrangement provides a particularly flexible attachment scheme for fixing the rotor shroud to the generator housing, as the brackets can be located in any position thereby accommodating the positioning of other components within the housing.

Preferably, to permit access to the fixing area, the brackets are positioned on regions of the generator housing that are accessed through an opening in an exterior wall of the generator housing. The brackets may be positioned onto an axially facing flanged opening of the generator housing.

According to another aspect of the present invention, there is provided an electrical power generating assembly substantially as described above.

According to another aspect of the present invention, there is provided a wind turbine comprising the electrical power generating assembly substantially as described above. In particular, the wind turbine comprises a wind turbine tower, a nacelle rotatably coupled to the tower, a rotating hub mounted to the nacelle, and a plurality of wind turbine blades coupled to the hub. The nacelle comprises the electrical power generating assembly.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above and other aspects of the invention will now be described, by way of example only, with reference to the accompanying drawings, in which:

FIGS. 5 to 7 are a sequence of views showing the assembly of the rotor shroud onto the generator.

Note that features that are the same or similar in different drawings are denoted by like reference signs.

SPECIFIC DESCRIPTION

A specific embodiment of the invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
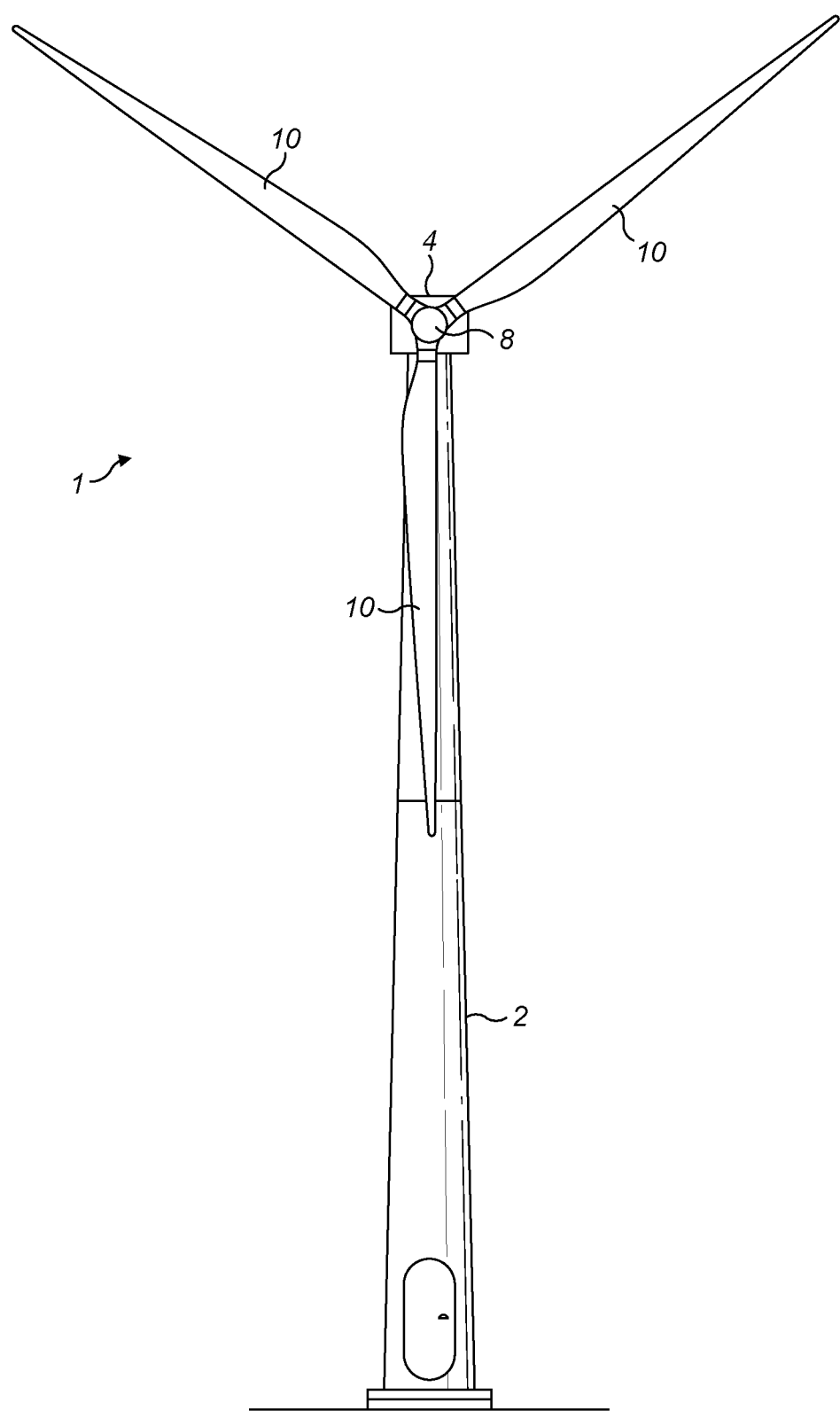
FIG. 1 is a schematic diagram of a wind turbine in which an electrical power generating assembly according to an embodiment of the present invention may be implemented.

In order to place the embodiments of the invention in a suitable context, reference will firstly be made to FIG. 1, which illustrates a typical Horizontal Axis Wind Turbine (HAWT) in which an electrical power generating assembly according to an embodiment of the invention may be implemented. Although this particular image depicts an on-shore wind turbine, it will be understood that equivalent features will also be found on off-shore wind turbines. In addition, although such wind turbines are referred to as 'horizontal axis', it will be appreciated by the skilled person that for practical purposes, the axis is usually slightly inclined to prevent contact between the rotor blades and the wind turbine tower in the event of strong winds.

As previously mentioned, the wind turbine 1 comprises a tower 2, a nacelle 4 rotatably coupled to the top of the tower 2 by a yaw system (not shown), a rotating hub or 'rotor' 8 mounted to the nacelle 4 and a plurality of wind turbine rotor blades 10 coupled to the hub 8. The nacelle 4 and rotor blades 10 are turned and directed into the wind direction by the yaw system.

Figure 2:
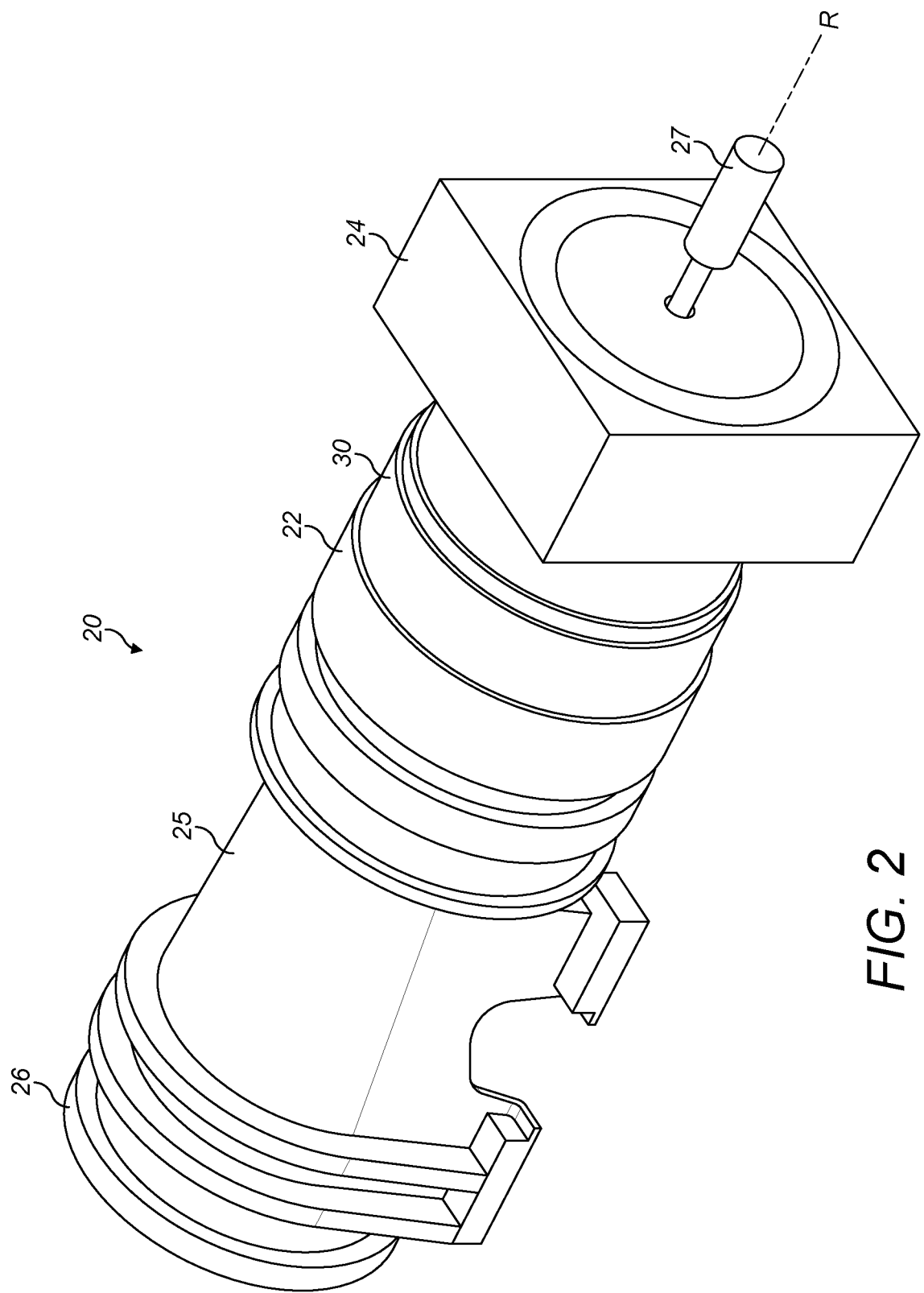
FIG. 2 is a schematic diagram of various functional power generating components located within the wind turbine nacelle of FIG. 1.

With reference to FIG. 2, the nacelle 4 comprises an electrical power generating assembly 20, which includes a gearbox 22 and a generator 24. A main shaft 26, is supported by a main bearing housing 25 and is connected to, and driven by, the rotor 8 and provides input drive to the gearbox 22. The gearbox 22 steps up the rotational speed of the low speed main shaft 26 via internal gears (not shown) and drives a gearbox output shaft (not shown). The gearbox output shaft in turn drives the generator 24, which converts the rotation of the gearbox output shaft into electricity. The electricity generated by the generator 24 may then be converted by other components (not shown) as required before being supplied to an appropriate consumer, for example an electrical grid distribution system. So-called "direct drive" wind turbines that do not use gearboxes are also known. In a direct drive wind turbine, the generator is directly driven by a shaft connected to the rotor. A so called 'pitch tube' 27 may be arranged to pass along the centre of the generator 24 and the gearbox 22 to provide one or both of hydraulic and electrical services to the hub. Thus, the pitch tube 27 is coaxial to the rotational axis of the wind turbine drive line, as depicted by the reference 'R'.

The gearbox 22 and generator 24 may be coupled together in an integrated unit to form the electrical power generating assembly 20. Such an integrated unit is shown in FIG. 2, but it should be noted that the gearbox and generator need not be integrated and could instead be separated axially.

With reference generally to the gearbox 22, a gearbox housing 30 is generally cylindrical in form and is oriented such that its major rotational axis is horizontal, in the orientation of the drawings. The cylindrical configuration of the gearbox housing 30 is due to the specific type of gearbox that is used in the illustrated embodiment, which is an epicyclic gearbox. As the skilled person would know, an epicyclic gearbox comprises a series of planet gears that are arranged about a central sun gear, and which collectively are arranged within an encircling ring gear. The ratio of the number of teeth between the ring gear, the planet gear and the sun gears determines the gear ratio of the gearbox. For clarity, fine detail of the gearbox will not be described in further detail here as the gearbox is not the principal subject of the invention. Suffice to say that other gearbox configurations could also be used, although it is currently envisaged that an epicyclic gearbox provides an elegant solution fit for the confines of a wind turbine nacelle.

Details of the generator 24 will now be described with reference also to FIGS. 3 and 4, which show the components of the generator 24 more clearly. It should be noted here that for brevity and clarity some components of the generator are not shown or described so as not to detract from the focus of this discussion. For example, the drive shaft by which the generator 24 is coupled to the gearbox is not shown.

However, it should be noted that the output shaft of the gearbox 22 interfaces with a rotor 32 of the generator 24. As such, the major axis of the gearbox output shaft defines the rotational axis of the generator 24, which coincides with the horizontal path of the pitch tube 27.

The generator 24 in the illustrated embodiment is an IPM (interior permanent magnet) electric machine having an external stator 36 which surrounds the rotor 32. By 'external', it is meant that the stator 36 is in a radially outer position relative to the rotor 32 and surrounds it as compared to generator designs in which the rotor is external to the stator. The active components of the generator 24 are housed within a generator housing 33 which in this embodiment is cuboidal in form.

The stator 36 includes stator windings 38 a stator core 40 and a stator frame (not shown in FIGS. 3 and 4) which surrounds and supports the stator windings 38 and stator core 40. At this point, it should be noted that the invention is not restricted to the specific configuration of stator that is shown here.

As has been mentioned the generator 24 is a type known as an 'external stator' generator, such that the rotor 32 is radially inwards of the stator 36, with respect to the rotational axis R. In this way, the rotor 32 rotates in the cylindrical volume defined by the stator 36. The rotor 32 comprises a generator rotor assembly 42 which has a non-drive end and a drive end. The non-drive end faces away from the wind turbine driveline, whereas the drive end faces toward the driveline and so is the end of the rotor 32 that couples to the gearbox, in use. The drive end of the generator rotor assembly 42 can be seen most clearly in FIG. 3 and is defined by a drive component in the form of a rotor shaft coupling 44 through which component drive from the gearbox shaft is transmitted to the generator rotor assembly 42.

Figure 4:
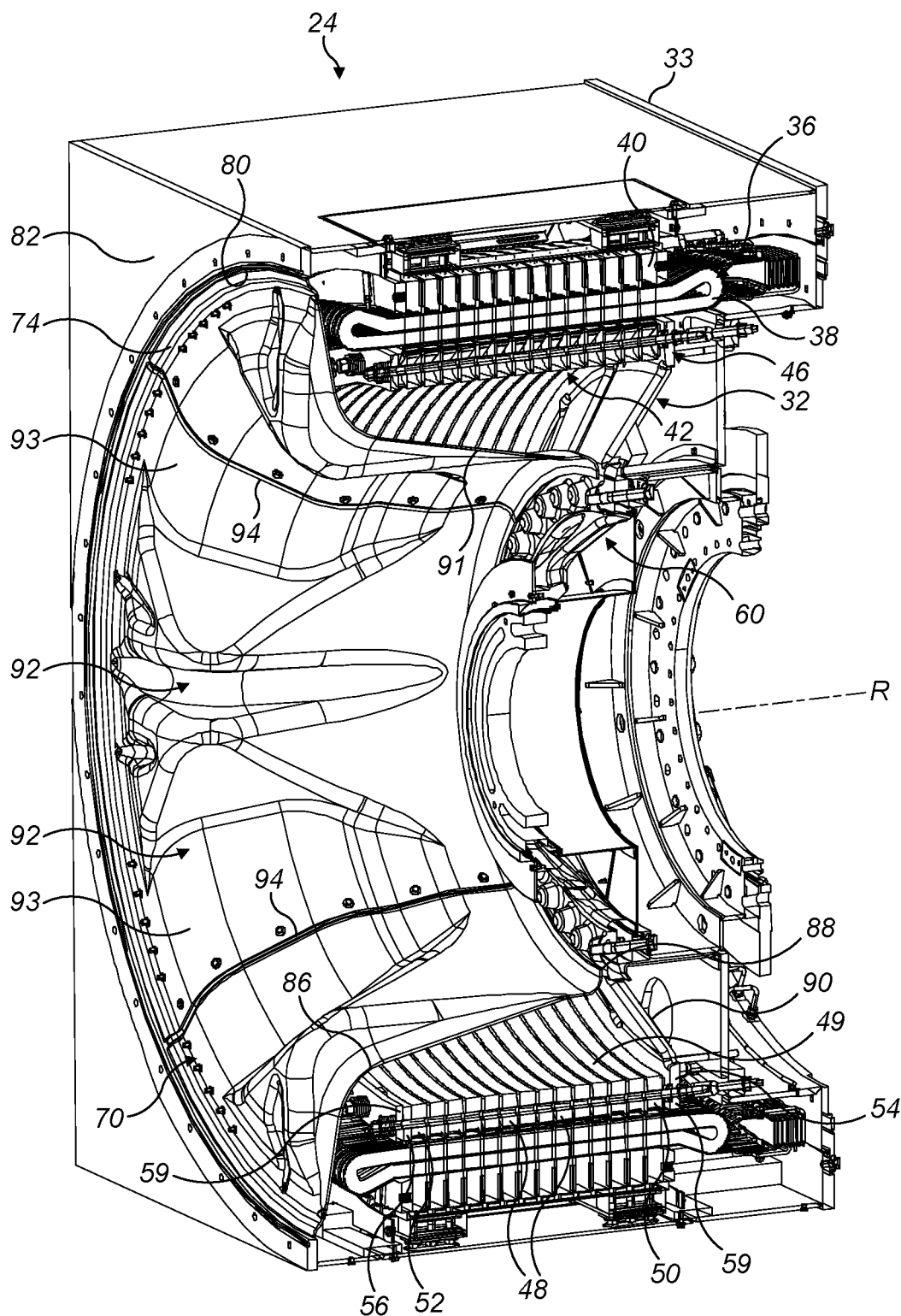
FIG. 4 is a section view of the generator in FIG. 3.

With more detailed reference to FIG. 4, the generator rotor assembly 42 is made up of a cylindrical ring structure 46 which is arranged to rotate around the rotational axis R.

The cylindrical ring structure 46 comprises a plurality of permanent magnet packages 48. In the present embodiment, the permanent magnet packages 48 are all of equal circumference and thickness. In some embodiments, the thickness of the permanent magnet packages 48 may vary with respect to one another. For example, the rotor 32 may comprise permanent magnet packages 48 of two different thicknesses, where the permanent magnet packages 48 of different thicknesses are arranged alternately. The permanent magnet packages 48 are arranged coaxially around the rotational axis R, such that when assembled the arrangement of permanent magnet packages 48 defines a cylindrical structure with a central hollow portion 49 radially inwards of the structure. The permanent magnet packages 48 are spaced apart by an equal distance such that a gap is defined in between each pair of permanent magnet packages 48. These gaps allow air that is provided centrally to the generator to flow through the rotor structure and cool the generator rotor assembly 42 as well as other parts of the generator, including parts that are located radially outside the rotor assembly 42. This airflow is further enhanced by the fact that no central hub is needed for providing structure and support for the rotor assembly 42.

The cylindrical ring structure 46 is defined by two end packages and a plurality of permanent magnet packages 48 provided between them. The two end packages comprise a first end package 50 and a second end package 52 arranged at opposite ends of the cylindrical ring structure 46. As shown in FIG. 4, the first end package 50 is located at the non-drive end of the cylindrical ring structure 46, and the second end package 52 is located at the drive end of the cylindrical ring structure 46.

It should be appreciated that an end package 50,52 is generally just a normal permanent magnet package, just like any other permanent magnet package 48 in the cylindrical ring structure 46, with the exception that it is provided at an end of the cylindrical ring structure 46. Alternatively, one or both of the end packages may have a greater thickness than the other permanent magnet packages 48. The end packages 50,52 may further comprise additional features for allowing connection of the cylindrical ring structure 46 to other parts of the generator or a coating that covers the outer surfaces of the cylindrical ring structure 46.

The permanent magnet packages 48 and the end packages 50, 52 are held in place by compression between a first end ring 54 that is located at the non-drive end of the generator and a second end ring 56 that is located at the drive end of the generator. A plurality of tie rods 58 are arranged circumferentially about the permanent magnet packages 48 and extend through respective tie rod bores defined therein. Spring packs 59 at respective ends of the tie rods 58 bear against the end rings 54,56 and thus place them and the permanent magnet packages 48 in compression. This arrangement of compressing the magnet packages 48 between end rings creates a solid assembly which prevents relative movement between the various components.

The generator rotor assembly 42 includes a generator rotor hub 60 by which means the magnetically active parts of the rotor assembly 42 are coupled to the gearbox drive shaft. This is achieved by the second end ring 54 being connected to or integral with the generator rotor hub 60 which extends radially inwards to define the rotor shaft coupling 44. The precise details of the generator rotor hub 60 are not central to the invention. However, it should be appreciated that the main function of the generator rotor hub 60 is to provide a mechanical connection between the rotor shaft coupling 44 which is at a radially inner position, to the second end ring 54 at a radially outer position. Note that the rotor shaft coupling 44 does not protrude a significant distance along the axial direction within the cylindrical volume circumscribed by the permanent magnet packages 48. This arrangement is therefore space efficient since it avoids the need for a structural central hub to support the magnet packages from the interior of the central volume. Furthermore, the relatively 'empty' space between the magnet packages 48 means that the assembly 42 has a relatively low mass compared to alternative configurations where the magnet packages are supported from a radial direction as opposed to being supported from an axial direction, as is shown here.

A further advantage of this configuration is that the open interior space makes it easier for maintenance personnel to perform installation and maintenance tasks on the generator.

However, in-situ maintenance work on such a generator presents challenges, particularly because of the magnetic field strength generated by the permanent magnet packages. High magnetic field strengths can present workspace risks to maintenance personnel because any metallic objects such as personal effects or tools introduced into the area are at risk of being attracted strongly to the magnetic packages 48. Unsecured articles could therefore risk damage to the generator rotor assembly 42.

To guard against any such in advertent damage, the generator 24 of the invention includes a cover or shroud 70 that provides protection to the rotor 32. Broadly, the function of the shroud 70 is to provide a protective tunnel-like surface that extends into the hollow interior defined by the cylindrical ring structure 46 that prevents objects such as metal tools from coming into contact with the magnet packages 48.

The shroud 70 is sized such that its surface is in a position where the magnetic field strength generated by the magnet packages has reduced in strength so as not to cause an attraction to tools made of ferromagnetic materials.

In this embodiment, the shroud 70 has the general shape of a bell or top hat in that it includes a dome portion 72 and a radially outer flange portion 74 that extends about and so surrounds the dome portion 72. The flange portion 74 provides a means to connect the shroud 70 to the generator 24. In this embodiment, the dome portion is generally frusto-conical shaped.

Figure 3:
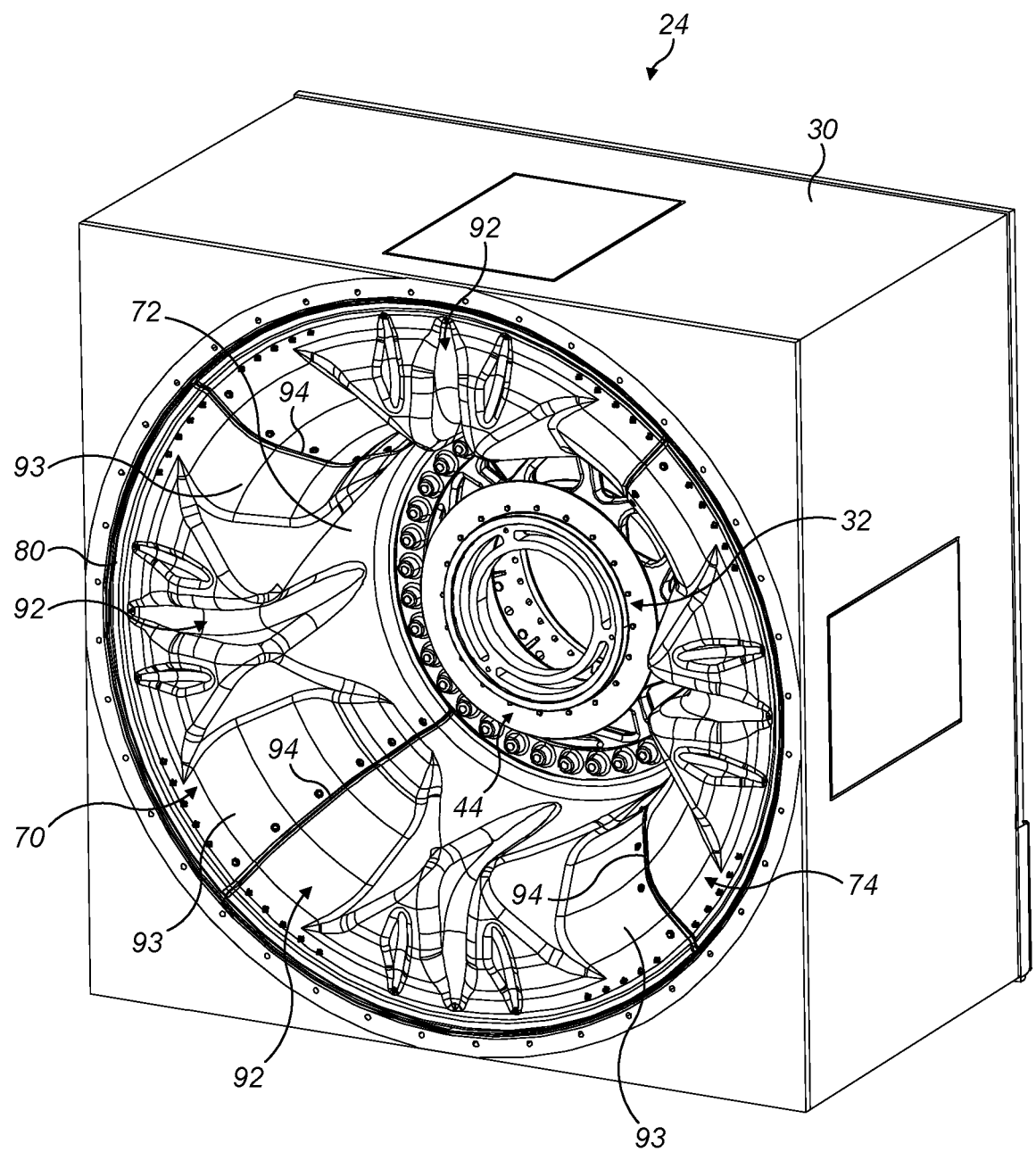
FIG. 3 is a perspective view of the generator shown in FIG. 2, depicting a rotor cowl or shroud in accordance with an embodiment of the invention.

As can be seen from FIGS. 3 and 4 the drive end of the generator 24 has a drive end opening 80. In this embodiment, that opening 80 is circular in shape and slightly larger in diameter than the diameter of the circular ring structure 46 and the stator 36. This difference in diameter is to allow those structures to be received into the generator housing 33 during assembly. The drive end opening 80 is defined on an annular flange in the form of a flat end face 82 of the generator housing 33 and has a diameter slightly less than the X and Y dimensions of the end face 82. The flange portion 74 of the shroud 70 has a shape that complements the drive end opening 80. Here, the drive end opening 80 is circular and the flange portion 74 also has a circular shape of substantially the same diameter. It should be appreciated however, that matching shapes is not essential.

The flange portion 74 may be connected to the generator housing 33 at the drive end opening 80 by mechanical fasteners such as bolts that are spaced around the circumference of the drive end opening 80. The fastening mechanism is not shown in detail in FIG. 4, but will be described in detail later. Brackets may be provided to couple the flange portion 74 and the drive end opening 80 indirectly.

Due to the bell-like shape of the shroud 70, when the flange portion 74 is adjacent the drive end opening 80 of the generator housing 33, the dome portion 72 is oriented so that it extends horizontally into the central hollow portion 49 of the rotor 32, in the orientation shown in the drawings. As will be appreciated from the cross-section view of FIG. 4, the flange portion 74 and the dome portion 72 are not strictly defined as separate parts, but blend into one another through a smooth transition portion 86 which, in effect, forms a base of the dome portion 72. The dome portion 72 tapers inwardly from where it rises out of the flange portion 74 at a shallow angle relative to the rotation axis R, but in general it has a relatively wide diameter being between about 50% and 60% of the diameter of the flange portion 74.

The head of the dome portion 72 is not a closed surface, but instead defines a dome opening 88. The dome opening 88 is circular in this embodiment and is centred on the rotational axis R of the generator. The shroud 70 is sized and configured such that the domed opening encircles the rotor shaft coupling 44. Notably, the shroud 70 is stationary, in use, relative to the rotor 32, and so the dome opening 88 is sized to be located immediately adjacent to the rotor shaft coupling 44 but to define a small gap therewith to allow the rotor shaft coupling 44 to rotate without coming into contact with the shroud 70. Currently it is envisaged that the clearance between the shroud and the rotor shaft coupling 44 should be between 5 mm and 20 mm, although these figures are given simply by way of example.

It will be appreciated from the above discussion, therefore, that the shroud 70 is only connected to the generator housing 33 at one of its end, namely the flange portion 74, and so the dome portion 72 is cantilevered in the direction non-drive end of the generator 24. The structure of the shroud 70 therefore has sufficient rigidity to resist deformation so that it retains its shape once installed and, importantly, that the clearance between the dome opening 88 and the rotor shaft coupling 44 is maintained to avoid the two components coming into contact with one another. As a measure to provide even more rigidity, it is envisaged that the gearbox may be shaped or be provided with appropriately-shaped formations to brace against the flange portion 74 of the rotor shroud 70 when the gearbox and the generator are assembled together into an integrated unit.

As can be seen particularly clearly from FIG. 4, the shroud 70 abuts against the drive end opening 80 of the generator housing 33, whereas it forms a clearance fit with the rotor shaft coupling 44 of the rotor 32. Furthermore, due to the continuous nature of the surface of the shroud 70, it defines an annular volume 90 with the interior surface of the cylindrical ring structure 46 which serves to direct cooling airflow more effectively through the circumferential gaps between the magnet packages 48. Therefore, the shroud 70 can be considered to define at least part of the cooling air flow path for the generator 24. Moreover, the surface of the dome portion 72 is spaced a predetermined distance from the magnetic packages so that the strength of the magnetic field has dissipated to a safe level. Purely by way of example, such a distance is envisaged to be within the region of 50 mm to 200 mm, although 100 mm is considered most optimal at the time of writing.

Remaining with FIG. 4, the radially inner surface 91 of the shroud 70 is shown clearly. An option for the inner surface 91 of the shroud 70 would be for it to have a smooth uniformly tapered surface extending from the dome portion 72 to the flange portion. However, in this embodiment, the inner surface 91 defines one or more functional surface features or formations 92. The formations 92 include one or more troughs or channels which may serve to capture lubrication fluid that may leak from shaft seals or the like and direct the fluid to a collection area (not shown) located at a suitable position near to the bottom of the generator housing 33. In this embodiment, the inner surface 91 of the shroud 70 is rotationally symmetric which is an advantage for assembly because the shroud 70 does not need to be aligned in any particular orientation in order for the surface formations 92 to be in the correct position. The channels also improve the stiffness of the rotor shroud. One option is to provide the radially inner surface 91 of the rotor shroud 70, and specifically the surface formations 92, with drainage apertures. Although not shown in the drawings, such drainage apertures would allow fluid run off to drip through the rotor shroud so it could be collected on the other side in a suitable collection reservoir. Possibly, the collection reservoir may be combined with an access hatch on the generator housing, preferably the access hatch which is underneath the generator.

Turning to the structure of the shroud 70, it is envisaged that a plastics material would be a suitable material from which the shroud 70 could be made. A thermoplastic polymer is one example of a suitable material, for example polycarbonate (PC) due to its tough and chemically resistive characteristics. Such materials are easily worked into a desired shape and are relatively light weight. What is more, thermoplastics may be available in optically transparent forms, which may be an advantage as it allows maintenance personnel to inspect regions of the generator through the cover without removing the cover from the generator.

Whether the shroud 70 is made from a thermoplastic or other material, one option is that it can be formed as a single piece. A thermoplastic material would be particularly suited to such a construction as it lends itself to vacuum forming over a suitably shaped die. However, in this embodiment it will be noted that the shroud 70 is formed from a plurality of sections 93 which are joined together to form the complete shroud 70. The separate sections 93 of the shroud 70 can be appreciated by observing the split lines 94 on the shroud 70 that can be seen in FIG. 4. As FIG. 4 is a section view, it should be appreciated that the shroud 70 would include four split lines 94 in total, meaning that the shroud 70 may be fabricated from four separate sections that are essentially identical in form. Such an arrangement would be beneficial because a shroud 70 could be transported in a disassembled form and then assembled, or constructed, during assembly of the generator. Prior to assembly, therefore, the individual shroud sections may be stored in a nested configuration, therefore saving space.

Figure 5:
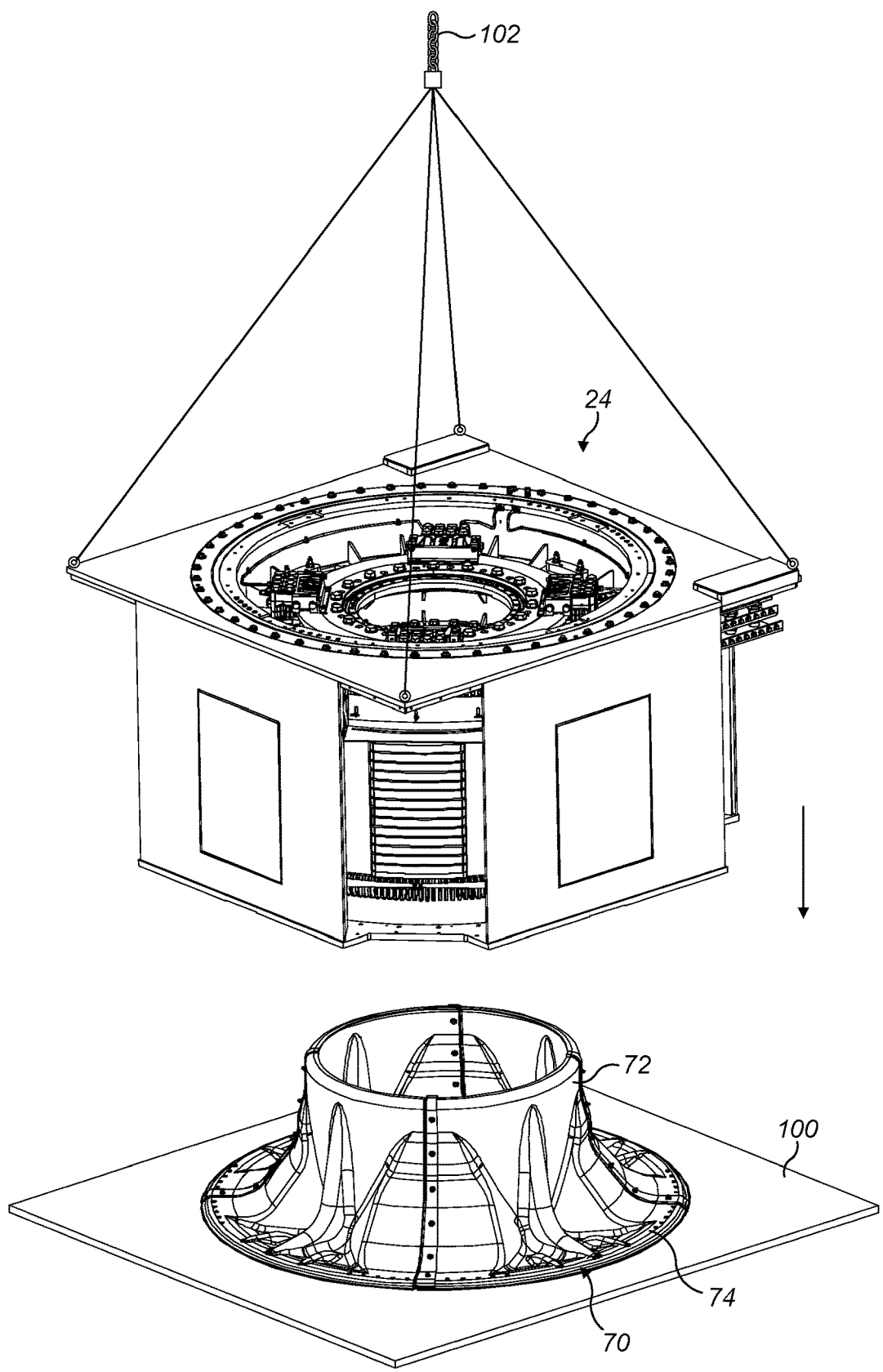
Figure 6:
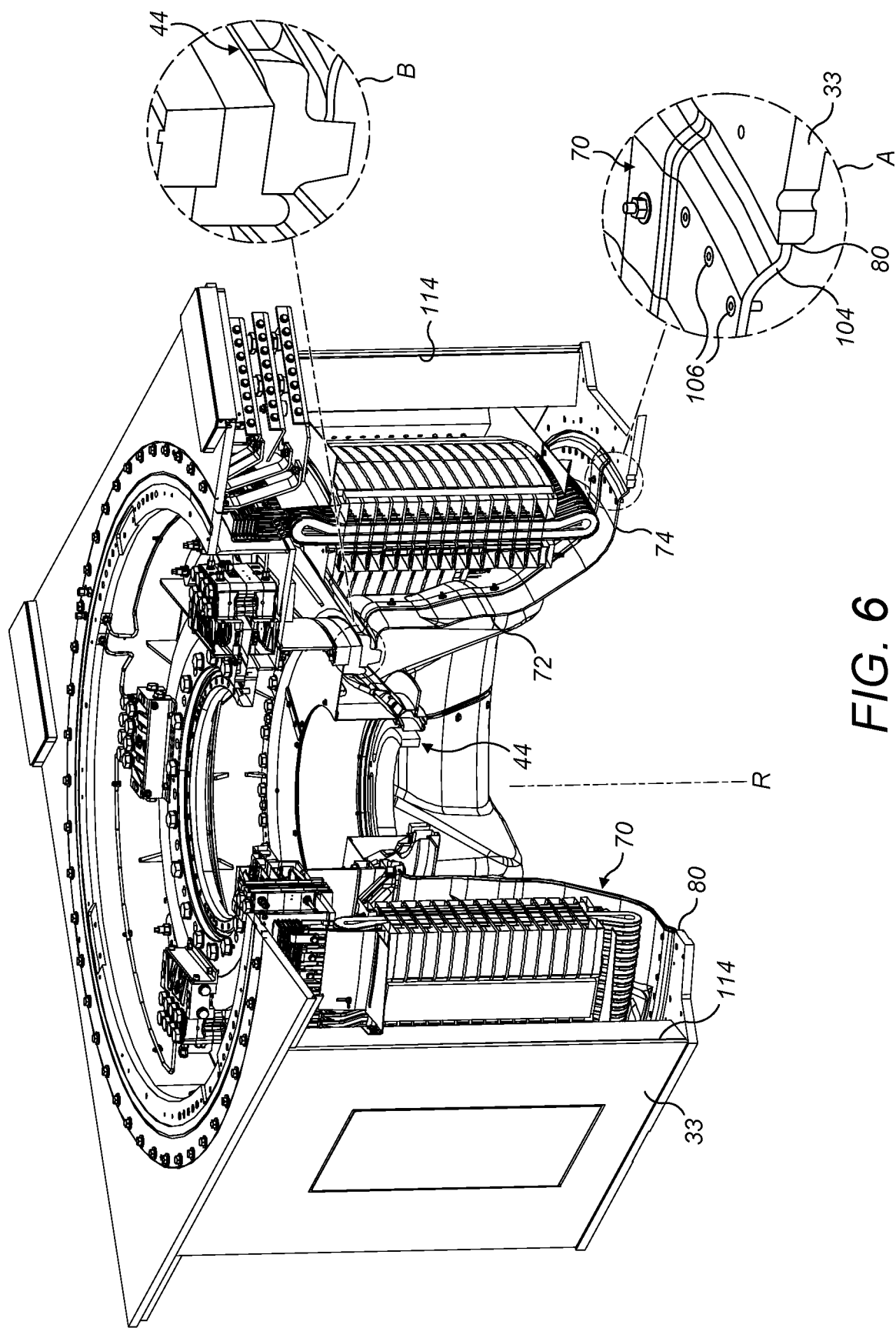

Having described the structural configuration of generator with its protective shroud 70, the discussion will now turn to an assembly process for the generator which is shown in a step-by-step manner in FIGS. 5 to 7.

Referring firstly to FIG. 5, the shroud 70 is shown supported on a base or platform 100, whilst the generator 24 is suspended above it from a lifting cable 102. Here, it can be seen that the generator 24 is aligned with the shroud 70 such that the dome portion 72 of the shroud is in line with the central hollow portion of the rotor.

The base 100 may be a portion of a floor in an assembly hall, for example, or it may be a separate component used for transportation of the shroud 70. The shroud 70 may be fixed to the base 100 by suitable temporary fasteners such as bolts or pins (not shown) or it may simply rest on the base 100. Optionally, guide features (not shown) such as ribs or posts may be provided on the base 100 to restrain the shroud 70 from moving out of position.

The shroud 70 is supported on the base 100 in an upright orientation such that the flange portion 74 of the shroud rests on the upper surface of the base 100 whilst the dome portion 72 points upwardly.

As can be seen in FIG. 5, the generator 24 is brought into position by a suitable lifting device such as a gantry crane and positioned over the shroud 70. This is largely a manual process which requires assembly technicians to control the positioning of the generator 24 accurately. However, it is envisaged that assistance could be provided by erecting vertical guide rails (not shown) that extend vertically upwards from predetermined installation points in the base in order to guide the generator 24 into the correction position as it is moved relative to, or lowered onto the shroud 70.

Although the lifting cable 102 may be used to lower the generator all the way down until the rotor shroud and the generator are fully assembled, this is not essential. For example, it is envisaged that the lifting cable 102 may be used to lower the generator part of the way, at which point an alternative mechanism may be used to move the rotor shroud towards the generator or final fixing. For example, a hydraulic lifting device may be used in this situation to provide very close control over the positioning of the rotor shroud relative to the generator.

Whereas FIG. 5 shows the initial positioning of the shroud 70 relative to the generator 24 whilst the generator is being lowered onto the base 100 so that the shroud 70 is received inside the central hollow portion of the generator 24, FIG. 6 shows a partial cutaway view of the generator with the shroud 70 in position. As can be seen in this figure, the shroud 70 is now located in the installed position as shown in FIG. 4, albeit the generator 24 is shown in a different orientation. Note that the base 100 is not shown in FIG. 6, but its presence is implied. The two inset panels in FIG. 6 illustrate how the shroud 70 engages with the adjacent components of the generator 24.

Referring firstly to the lower inset panel, 'A', it will be appreciated that when the shroud 70 is received fully into the hollow central portion 49 of the generator 24, a circumferential lip 104 of the flange portion 74 abuts the drive end opening 80 of the generator housing 33. Slightly inboard of the circumferential lip 104 is an array of holes 106 which are used to secure the flange portion 74 to the housing 33 as will be described below with reference to FIG. 7.

Turning to the upper inset panel, 'B', it can be seen that the dome opening 88 encircles the rotor shaft coupling 44 so that the dome opening 88 sits very close to the coupling but does not touch it. The rigidity of the shroud 70 ensures that this clearance is maintained even when the generator 24 is placed into a horizontal orientation.

FIG. 7 demonstrates one option for how the shroud 70 may be attached to the generator housing 33. Here, a plurality of brackets 110 are provided which span or overlay a respective region of the housing 33 and a neighbouring region of the flange portion 74 of the shroud 70. As can be seen by the two inset panels, suitable mechanical fasteners 112 such as bolts are used to secure the brackets 110 in position. It is envisaged bolts are preferable since they are readily removable, but snap-in fixings could be used as an alternative.

Notably, the approach of using the brackets 110 to connect the shroud 70 and the housing at predetermined circumferential points is a convenient way to join these two components. Firstly it avoids the need to use direct fixings about the entirely of the circumference of the shroud 70. Secondly, the brackets 110 are located in regions where they can be accessed through an opening in an exterior wall of the housing 33. In this embodiment, it will be noted that the housing 33 is generally square in cross section, although corner regions 114 of the housing are open in order to provide access to its interior.

Conveniently, the approach discussed above of lowering the generator 24 onto the shroud 70 into a correctly aligned position, and then fixing the shroud 70 to the housing 33 is an effective way of assembling the two components. As the shroud 70 is supported on its flange portion 74, it provides a very stable position or datum on which to lower the generator 24 into place. As discussed above, suitable alignment formations can be provided on the base and/or the shroud 70 in order to locate the shroud 70 into the correct position before the generator is brought into place. Assembly workers therefore need to concern themselves only with a single suspended load when assembling the generator and the shroud, which provides a more efficient and safer assembly process.

The specific embodiment described above illustrates one way in which the invention may be performed. Some variants are also described above, but the skilled person may conceive of other alterations and modifications that could be made to the specific embodiments without departing from the scope of the invention, as defined by the claims.

In the above embodiment, it has been described that an assembly process may comprise of arranging the rotor shroud 70 on a base 100, arranging the generator above the rotor shroud, aligning the two components, and then lowering the generator onto the rotor shroud so that the upstanding dome portion 72 of the rotor shroud 70 is received into the internal volume of the generator. However, it is envisaged that it would be also acceptable to lower the rotor shroud 70 into the generator. In such an embodiment, the generator housing 33 is supported on the base 100, but supported in an orientation in which the open ended central hollow portion 49 of the generator 24 points upwardly. In this position, therefore, the generator 24 is ready for receiving the rotor shroud. The rotor shroud 70 may then be arranged directly above the generator 24 in line with the central hollow portion 49, supported as necessary by a lifting arrangement, for example a lifting cable 102 as discussed in connection with the previous embodiment. Once aligned, the rotor shroud 70 and the generator 24 may be moved relative to one another by lowering the rotor shroud 70 towards the generator 24 so that the dome portion 72 of the rotor shroud is received into the central hollow portion 49 of the generator 24. Once the two components are assembled, they suitably can be fixed together, for example in a manner as discussed with referenced to the previous embodiment.

The invention claimed is:

1. An electrical power generator for a wind turbine comprising:
a generator housing housing a stator at a radially outward position and a rotor in a radially inward position, wherein the rotor comprises a cylindrical ring structure arranged about a rotational axis and defining a central hollow portion,
further comprising a rotor shroud attached to the generator housing and which extends about the rotational axis, wherein the rotor shroud includes a dome portion that extends into the central hollow portion of the rotor so as to protect the cylindrical ring structure of the rotor.

2. The electrical power generator of claim 1, wherein the rotor shroud includes a flange portion that flares radially outwards from the dome portion.

3. The electrical power generator of claim 2, wherein the flange portion is fixed to the housing.

4. The electrical power generator of claim 3, wherein one or more fixing brackets overlap the flange portion and respective regions of the housing so as to fix the flange portion to the housing.

5. The electrical power generator of claim 3, wherein the flange portion is fixed to an annular flange of the housing that defines a central opening.

6. The electrical power generator of claim 1, wherein the rotor shroud comprises a plurality of separable sections.

7. The electrical power generator of claim 1, wherein the rotor shroud is shaped to define one or more channels in a radially inward facing surface thereof.

8. The electrical power generator of claim 1, wherein the dome portion defines an opening.

9. The electrical power generator of claim 8, wherein the opening extends about the rotational axis.

10. The electrical power generator of claim 8, wherein the rotor shroud is configured such that the opening of the dome portion is positioned proximal to a drive component of the rotor.

11. The electrical power generator of claim 10, wherein the opening of the dome portion defines a predetermined clearance with the drive component of the rotor.

12. The electrical power generator of claim 1, wherein the shroud is connected to the generator housing at only one of its ends along said rotational axis such that the dome portion is cantilevered in the other end.

13. The electrical power generator of claim 1, wherein the shroud is at least partly made from an optically transparent material.

14. An electrical power generating assembly comprising a gearbox and an electrical power generator according to claim 1, wherein the output shaft of the gearbox is co-axial with said rotational axis.

15. A wind turbine comprising a wind turbine tower, a nacelle rotatably coupled to the tower, a rotating hub mounted to the nacelle, and a plurality of wind turbine blades coupled to the hub, wherein said wind turbine comprises an electrical power generator according to claim 1.

16. A method of assembling an electrical power generator for a wind turbine, comprising:
- providing an electrical generator comprising a generator housing, said generator housing housing a stator at an outward position and a rotor in an inward position, wherein the rotor comprises a cylindrical ring structure arranged about a rotational axis so as to define a central hollow portion,
- providing a rotor shroud comprising a radially outer flange portion and a radially inner dome portion upstanding from the flange portion,
- orienting the electrical generator so that the rotational axis is substantially vertical,
- aligning the rotor shroud with the electrical generator such that the dome portion of the rotor shroud is in line with the central hollow portion of the rotor,
- moving the electrical generator and the rotor shroud relative to one another such that the dome portion of the rotor shroud is received into the central hollow portion of the rotor,
- fixing the flange portion of the rotor shroud to the generator housing.

17. The method of claim 16, wherein:
the step of providing the rotor shroud includes placing the rotor shroud on a base,
wherein the electrical generator is supported above the rotor shroud prior to moving the electrical generator and the rotor shroud relative to one another, and
wherein the step of moving the electrical generator relative to the rotor shroud includes moving the electrical generator towards the rotor shroud.

18. The method of claim 16, wherein:
the step of providing the electrical generator includes placing the electrical generator on a base,
wherein the rotor shroud is supported above the electrical generator prior to moving the electrical generator and the rotor shroud relative to one another, and
wherein the step of moving the electrical generator relative to the rotor shroud includes moving the rotor shroud towards the electrical generator.

19. The method of claim 17, wherein the base includes an alignment formation.

20. The method of claim 16, wherein fixing the flange portion to the generator housing further comprises positioning one or more brackets on the generator housing, said brackets overlaying a respective region of the generator housing and a neighbouring region of the flange portion of the rotor shroud; fastening the brackets to the generator housing and the flange portion.

21. The method of claim 20, wherein the brackets are positioned on regions of the generator housing that are accessed through an opening in an exterior wall of the generator housing.

22. The method of claim 20, where the brackets are positioned onto an axially facing flanged opening of the generator housing.

* * * * *